United States Patent
Liu et al.

(10) Patent No.: US 11,134,064 B2
(45) Date of Patent: Sep. 28, 2021

(54) NETWORK GUARD UNIT FOR INDUSTRIAL EMBEDDED SYSTEM AND GUARD METHOD

(71) Applicant: SHENYANG INSTITUTE OF AUTOMATION, CHINESE ACADEMY OF SCIENCES, Liaoning (CN)

(72) Inventors: Xianda Liu, Liaoning (CN); Tianyu Wang, Liaoning (CN); Jianming Zhao, Liaoning (CN); Bowen Zhang, Liaoning (CN); Peng Zeng, Liaoning (CN); Haibin Yu, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 276 days.

(21) Appl. No.: 16/316,290

(22) PCT Filed: Jun. 7, 2018

(86) PCT No.: PCT/CN2018/090199
§ 371 (c)(1),
(2) Date: Jan. 8, 2019

(87) PCT Pub. No.: WO2019/100691
PCT Pub. Date: May 31, 2019

(65) Prior Publication Data
US 2020/0045023 A1    Feb. 6, 2020

(30) Foreign Application Priority Data
Nov. 27, 2017 (CN) .......... 201711202152.X

(51) Int. Cl.
*H04L 29/06* (2006.01)
*H04L 9/08* (2006.01)
*G06F 21/33* (2013.01)

(52) U.S. Cl.
CPC .......... *H04L 63/0428* (2013.01); *G06F 21/33* (2013.01); *H04L 9/0838* (2013.01); *H04L 29/0653* (2013.01)

(58) Field of Classification Search
CPC .. G06F 21/6236; G06F 21/445; G06F 21/604; G06F 21/85; G06F 21/33;
(Continued)

(56) References Cited

U.S. PATENT DOCUMENTS 8,332,657 B1 * 12/2012 Eskicioglu ............. H04N 7/163
713/193
2004/0158744 A1 * 8/2004 Deng ................... H04L 49/9057
726/13
(Continued)

FOREIGN PATENT DOCUMENTS

CN        103036886 A    4/2013

OTHER PUBLICATIONS

Engineers' Guide to Medical Electronics, VP/Associate Publisher, 2012, pp. 1-52.*
(Continued)

*Primary Examiner* — Mohammad A Siddiqi
(74) *Attorney, Agent, or Firm* — Novick, Kim & Lee, PLLC; Allen Xue

(57) ABSTRACT

The present invention relates to a network guard unit for an industrial embedded system and a guard method. The specific method is to form the network guard unit (NGU) through security technologies, such as integrated access control, identity authentication and communication data encryption, to provide active guard for a site control device.
(Continued)

The NGU comprises an access control module, an identity authentication module, a data encryption module, a key negotiation module and a PCIE communication module, and supports the communication modes of dual network cards and PCIE bus. The present invention builds a secure and trusted operating environment for industrial control systems in combination with an active guard technical means in the field of information security on the basis of ensuring the correctness and the feasibility of security of various terminal devices in the industrial control systems.

7 Claims, 5 Drawing Sheets

(58) Field of Classification Search
CPC . H04L 63/061; H04L 9/3247; H04L 63/0428; H04L 9/0838; H04L 9/0841; H04L 9/3268; H04L 29/0653; H04L 69/22; H04L 63/0227; H04L 63/0272; H04L 63/0823

See application file for complete search history.

(56) References Cited

U.S. PATENT DOCUMENTS

| | | | |
|---|---|---|---|
| 2006/0074917 A1* | 4/2006 | Chand | H04L 63/10 |
| 2007/0162777 A1* | 7/2007 | Imao | G06F 1/3209 |
| | | | 713/320 |
| 2008/0276010 A1* | 11/2008 | Fuchs | G06F 13/102 |
| | | | 710/8 |
| 2011/0314536 A1 | 12/2011 | Kuckelman et al. | |
| 2013/0179622 A1* | 7/2013 | Pratt | G06F 13/409 |
| | | | 710/314 |
| 2017/0249279 A1* | 8/2017 | Lee | G06T 1/20 |
| 2018/0097639 A1* | 4/2018 | Gulati | G06F 8/61 |

OTHER PUBLICATIONS

Design of Security Gateway Based On Dual-Homed Architecture;Yonghong Shi, Jianzhong Shen,Lin Zhang, Qian Zhang ,Shaofeng Lin;International Conference on Robots & Intelligent System; pp. 1-5.*

Wan, Ming et al. "Trusted Security Defense Architecture for Industrial Embedded Device", Instrument Standardization and Metrology, ISSN:1672-5611, 2015, Issue 6, Dec. 26, 2015, pp. 18-21.

* cited by examiner

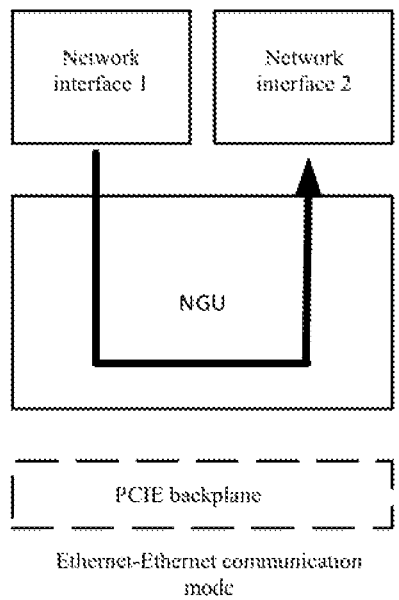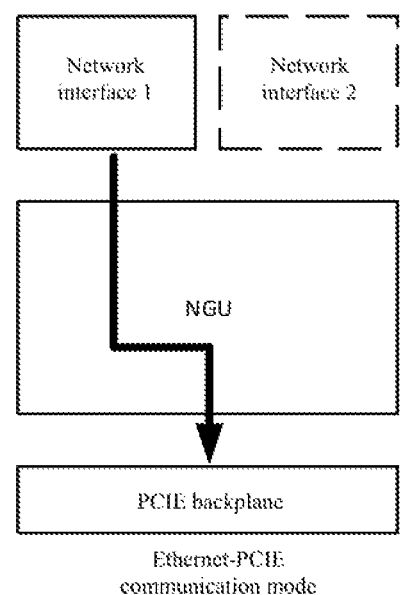
FIG. 3a    FIG. 3b
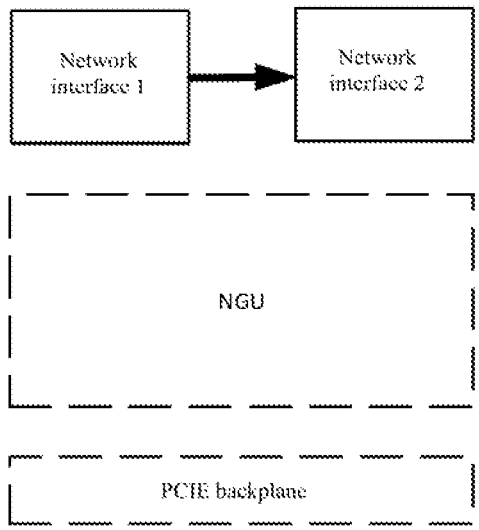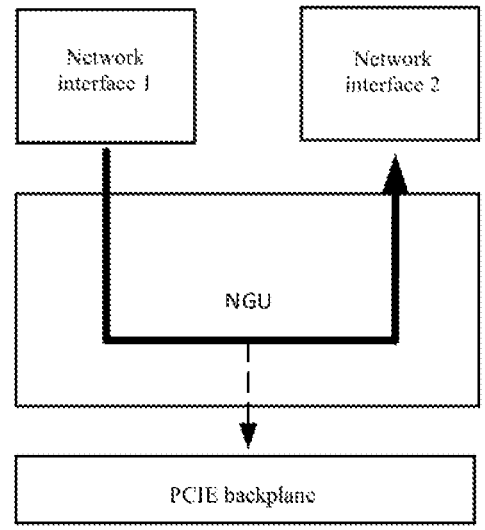
FIG. 4a    FIG. 4b

NETWORK GUARD UNIT FOR INDUSTRIAL EMBEDDED SYSTEM AND GUARD METHOD

TECHNICAL FIELD

The present invention relates to a network guard unit architecture for an industrial embedded system and a design method. Different from passive defense technologies such as traditional firewall and single network guard devices, the present invention applies traditional security guard mechanisms of information security to software and hardware design of embedded devices with respect to application scenarios and functional characteristics of industrial embedded system devices to enhance prevention capability of information security risk of industrial embedded communication devices, and belongs to the field of security of industrial control networks.

BACKGROUND

For all kinds of potential security hazards in industrial control systems, traditional information security guard technologies and product schemes of the industrial control systems are mainly as follows:

(1) industrial firewall, which is similar to general IT firewall in terms of types and key technologies and is generally divided into packet filtering, status packet detection and proxy server; an access control table can also be formed in accordance with a filtering logic set in the system to screen key factors of data packets to decide whether the data packets are allowed to pass;

(2) virtual private network (VPN) technology, which is a logic network technology that establishes security, exclusiveness and autonomy on a public network infrastructure using security mechanisms of encryption and authentication; and a virtual networking technology can be used to build a dedicated communication network with high security level and high reliability;

(3) network isolation. Different architectures are used to network between a corporate management network and an industrial control system network to enhance network information security. An intermediate demilitarized zone (DMZ) network is established between the management network and the industrial control system network generally using information security products such as the firewall, to prevent direct communication between two networks.

At present, security guard products widely used in industrial control systems are mainly industrial firewalls. Such firewalls support a variety of industrial control system communication protocols and field buses based on the traditional IT firewall. However, such firewall are only an IP address based authentication, and do not have the identity authentication function, encryption communication function, etc. The discrimination condition of packet filtering is part of information at the head of data packets. This part of information is uncertain and easy to be disguised.

Secondly, some firewalls do not provide deep protocol parsing, and cannot detect the attack realized through application layer protocols. Moreover, the security level of the firewalls usually depends on a specified filtering rule table, and there is no good testing tool to inspect their correctness and conflict, which can easily lead to vulnerability.

Finally, for services that use dynamic or randomly assigned ports, the firewalls are difficult to authenticate effectively, such as remote procedure call (RPC), etc.

In conclusion, the present invention realizes guard for key devices to be guarded in industrial control systems based on active guard technologies using many security guard means such as access control, identity authentication, data encryption and trusted start with regard to application characteristics and composition structures of embedded devices in the field of the industrial control systems. On the premise that the normal operation of key devices is not affected, the data traffic in the industrial control system network is identified and filtered to prevent malicious data packets from causing harm to process control system devices such as PLC, so as to realize the guard for the industrial control systems.

SUMMARY

In view of the above technical defects, the purpose of the present invention is to provide a network guard unit (NGU) for an industrial embedded system.

A technical solution adopted in the present invention to solve the technical problem is as follows: A network guard unit for an industrial embedded system comprises:

an access control active detection module used for filtering and intercepting a data flow without access permission, and immediately blocking data communication and giving an alarm when an unauthorized access flow is detected;

an identity authentication module used to conduct identity validity authentication using a site control device of NGU through own device certificates and other communication nodes and allow communication after passing the authentication;

a key negotiation module used for detecting whether a key used by a communication encryption function has vulnerability and/or is overdue; if so, conducting negotiation operation of a session key;

a communication data encryption/decryption module used for establishing encryption/decryption communication connection after passing identity authentication using the site control device of NGU; and encrypting and decrypting data to be communicated using a domestic commercial cipher series algorithm;

a NGU dual-network card mode communication module and/or a NGU network card+PCIE communication module, wherein the NGU dual-network card mode communication module is used for encrypting communication data between embedded devices by using a pair of NGUs to build a virtual communication link when the NGU as an individual module is put externally in an embedded device communication network;

the NGU network card+PCIE communication module is used for the PLC as a primary device and the NGU as a secondary device to share two data regions inside the NGU to exchange resources in a communication interface mode of PCIE when the NGU and the embedded device form a system, to realize communication data conversion between the PCIE and the network card.

The access control active detection module executes the following steps:

a) firstly, capturing data flows through a promiscuous mode of a network card;

b) conducting protocol analysis on the captured data;

c) parsing an application layer protocol of a protocol; and d) matching protocol parsing contents in the data flows with the set matching rule contents for consistence; if consistent, releasing the data flows; otherwise, intercepting the data flows and warning.

3. The network guard unit for the industrial embedded system according to claim 1, wherein the implementation of the NGU dual-network card mode communication module comprises the following steps:

a) firstly, respectively setting a pair of NGUs as a serving and a client, associating a physical network card 2 of the server NGU with an embedded device A, and creating a virtual network card device TAP0;

b) associating a physical network card 2 of the client NGU with an embedded device B, creating a virtual network card device TAP1, and communicating with the server NGU;

c) bridging the physical network card 2 of the server NGU and the virtual network card device TAP0 as a bridge device br0, and bridging the physical network card 2 of the client NGU and the virtual network card device TAP1 as a bridge device br1; and d) connecting the server NGU and the client NGU into an actual network, i.e., establishing a virtual communication connection between the NGUs, responsible for encrypting the communication data between the embedded devices.

The implementation of the NGU device network card+PCIE communication module comprises the following steps:

a) establishing two cache regions by the NGU, i.e., bar0 and bar1; using bar0, being FIFO of 32 bits, as interaction of descripter between the NGU and a PLC main controller; using bar1 as a polling mode data buffer region; in a polling mode, when there is data interaction, firstly writing the data into bar1 buffer region; then combining the writing length and the writing address of the bar1 buffer region into the descripter and writing the descripter into bar0; reading bar0 data at the other end; and reading out data in bar1;

b) in a data communication process, regarding the NGU as an external connection network card of the PLC main controller; the data entering through a network interface of the NGU; the NGU capturing a data packet through a libpcap packet capture program; subsequently, the NGU writing the data packet into the bar1 buffer region and combining a writing address and a writing length into the descripter of 32 bits; writing the descripter into bar0; in a writing process, detecting a bar0 state at first; if bar0 is full, returning an error; and c) after receiving bar0 data, the PLC main controller reading out data in bar1 according to the descripter and processing the network data packet.

The network guard unit also comprises transmission of the network data packet by the NGU, comprising the following steps:

firstly, writing the data packet into the bar1 buffer region, combining into a descripter according to the writing address and the length, and writing into bar0 if bar0 is not full; polling bar0 every several ms at the NGU; when bar0 is not empty, the NGU reading out the descripter in bar0 and reading out the data packet cached in bar1 according to the descripter; and sending out the data packet through libpcap via the network interface.

The domestic commercial cipher series algorithm comprises one or more of SM2, SM3 and SM4.

A guard method for the network guard unit for the industrial embedded system comprises the following steps:

an access control active detection module filtering and intercepting a data flow without access permission, and immediately blocking data communication and giving an alarm when an unauthorized access flow is detected;

an identity authentication module conducting identity validity authentication using a site control device of NGU through own device certificates and other communication nodes, and allowing communication after passing the authentication;

a key negotiation module detecting whether a key used by a communication encryption function has vulnerability and/or is overdue; if so, conducting negotiation operation of a session key;

a communication data encryption/decryption module establishing encryption/decryption communication connection after passing identity authentication using the site control device of NGU; and encrypting and decrypting data to be communicated using a domestic commercial cipher series algorithm;

a NGU dual-network card mode communication module and/or a NGU network card+PCIE communication module, wherein the NGU dual-network card mode communication module is used for encrypting communication data between embedded devices by using a pair of NGUs to build a virtual communication link when the NGU as an individual module is put externally in an embedded device communication network;

the NGU network card+PCIE communication module is used for the PLC as a primary device and the NGU as a secondary device to share two data regions inside the NGU to exchange resources in a communication interface mode of PCIE when the NGU and the embedded device form a system, to realize communication data conversion between the PCIE and the network card.

A step that the NGU dual-network card mode communication module encrypts communication data between embedded devices by using a pair of NGUs to build a virtual communication link comprises the following steps:

a) firstly, respectively setting a pair of NGUs as a serving and a client, associating a physical network card 2 of the server NGU with an embedded device A, and creating a virtual network card device TAP0;

b) associating a physical network card 2 of the client NGU with an embedded device B, creating a virtual network card device TAP1, and communicating with the server NGU;

c) bridging the physical network card 2 of the server NGU and the virtual network card device TAP0 as a bridge device br0, and bridging the physical network card 2 of the client NGU and the virtual network card device TAP1 as a bridge device br1; and d) connecting the server NGU and the client NGU into an actual network, i.e., establishing a virtual communication connection between the NGUs, responsible for encrypting the communication data between the embedded devices.

A step that the NGU network card+PCIE communication module enables two devices to share two data regions inside the NGU to exchange resources to realize communication data conversion between the PCIE and the network card comprises the following steps:

a) establishing two cache regions by the NGU, i.e., bar0 and bar1; using bar0, being FIFO of 32 bits, as interaction of descripter between the NGU and a PLC main controller; using bar1 as a polling mode data buffer region; in a polling mode, when there is data interaction, firstly writing the data into bar1 buffer region; then combining the writing length and the writing address of the bar1 buffer region into the descripter and writing the descripter into bar0; reading bar0 data at the other end; and reading out data in bar1;

b) in a data communication process, regarding the NGU as an external connection network card of the PLC main controller; the data entering through a network interface of the NGU; the NGU capturing a data packet through a libpcap packet capture program; subsequently, the NGU writing the data packet into the bar1 buffer region and combining a writing address and a writing length into the descripter of 32 bits; writing the descripter into bar0; in a writing process, detecting a bar0 state at first; if bar0 is full, returning an error; and c) after receiving bar0 data, the PLC main controller reading out data in bar1 according to the descripter and processing the network data packet.

The guard method unit also comprises transmission of the network data packet by the NGU, comprising the following steps:

firstly, writing the data packet into the bar1 buffer region, combining into a descripter according to the writing address and the length, and writing into bar0 if bar0 is not full; polling bar0 every several ms at the NGU; when bar0 is not empty, the NGU reading out the descripter in bar0 and reading out the data packet cached in bar1 according to the descripter; and sending out the data packet through libpcap via the network interface.

The present invention has the following beneficial effects and advantages:

1. The present invention builds a secure and trusted operating environment for industrial control systems in combination with an active guard technical means in the field of information security on the premise of ensuring the security objectives of the functions of production, control and management for PLC, RTU, the controller and SCADA system in the industrial production process.

2. The present invention effectively combines access control, identity authentication, abnormality detection and other technologies, and solves the puzzling problem of the security risk in a traditional passive response filtering rule for the industrial control systems.

3. The present invention supports two operating modes, i.e., the network card-network card mode and the network card-PCIE mode and supports internal system communication between the NGU and the PLC through PCIE with respect to the structure and application characteristics of industrial embedded communication devices.

4. The present invention supports encryption for communication data between embedded devices by building a dedicated virtual communication network, thereby ensuring data privacy.

5. The present invention provides a capability of dynamically treating security threat for the industrial control systems.

DESCRIPTION OF DRAWINGS

FIG. 3a is a schematic diagram 1 of dual communication modes of NGU in the present invention;

FIG. 3b is a schematic diagram 2 of dual communication modes of NGU in the present invention;

FIG. 4a is a functional schematic diagram 1 of Bypass in the present invention;

FIG. 4b is a functional schematic diagram 2 of Bypass in the present invention;

DETAILED DESCRIPTION

Figure 1:
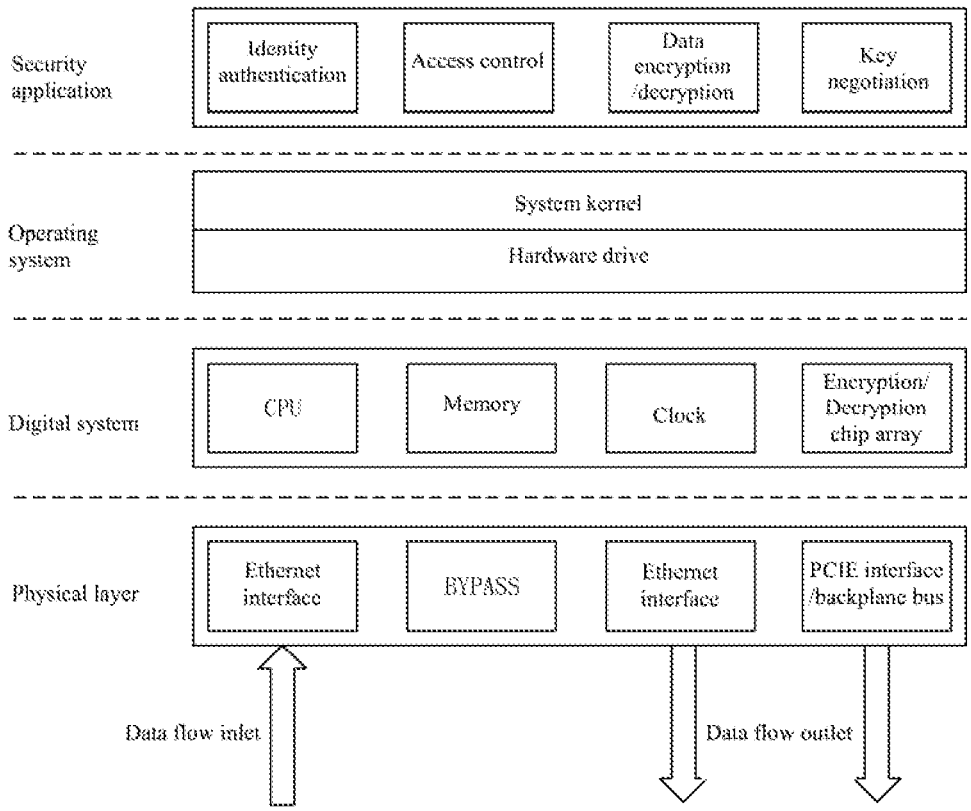
FIG. 1 is a structural schematic diagram of a NGU device system in the present invention.

The present invention will be further described in detail below in combination with the drawings and the embodiments.

A network guard unit for an industrial embedded system is provided. A site control device conducts active management and control and passive response through security guard technical means such as access control, identity authentication and data communication encryption to give an alarm for abnormal behaviors, and the network guard unit comprises the following steps:

Dual physical communication modes. Considering that NGU communicates with different devices in different environments, NGU supports the traditional Ethernet-Ethernet communication interface mode and also supports the Ethernet-PCIE (or other backplane bus) mode. Different communication interfaces can be selected according to different network data and different devices to enhance applicability of the NGU.

Hardware encryption/decryption mode. The industrial control system has strict requirements for processing duration of data in the NGU. A secure SD control chip is used to conduct hardware encryption/decryption and signature operation on the data to ensure that processing time is within a controllable range, and supports multiple data encryption/decryption algorithms of DES, 3DES, AES, SM1, SM4 and SSF33 and three signature algorithms of RSA, ECC and SM2 for application of different encryption/decryption and signature algorithms.

Bypass function. In case of power interruption or failure, the NGU is in a state that Bypass is started. Two networks connected to the NGU are directly communicated physically. The data does not pass through the NGU device. After the device is normally started, the Bypass is switched to a closed state and the data enters the NGU device to ensure the connectivity of the entire network in any case.

Access control. For data traffic that passes through the network guard unit (NGU), a corresponding access control strategy shall be formulated to limit the access of unallowable instructions or invalid data for the control system. The access control function is designed based on a "white list" mode. A default rule prevents all data traffic, and only the traffic consistent with an allowable access rule can be released, otherwise the data is intercepted and an alarm is given.

Identity authentication. After the device is connected to the industrial network, a digital certificate is used for bidirectional authentication and CRL certificate validation verification is provided in many ways to provide manufacture and verification functions of digital signatures in the formats of PKCS1/PKCS7, attach/PKCS7, detach/XML, etc.

Communication data encryption. To improve the confidentiality need in the process of data transmission, ciphertext transmission is used to replace clear text transmission. Data encryption ensures the security in the process of data transmission through the combination of symmetrical encryption algorithm and asymmetric encryption algorithm.

Key certificate management which is used to ensure normal realization of identity authentication function and communication encryption function. Main root certificates and signature private keys which participate in the operation process of data encryption and the digital certificate application of the device are securely stored. A security cipher chip array that prevents DPA/SPA power consumption attack is used to securely store key keys and certificates.

Key negotiation. Both parties of communication establish communication connection and then conduct security key consultation to ensure that a communication key in each session has the characteristic that one cipher is present in one session and is generated randomly. Security protocols such as Diffie-Hellman (DH) shall be followed to complete key negotiation, and the key negotiation is completed inside the chip to ensure that the key may not be disclosed in manufacture and use.

NGU dual-network card mode communication. Communication data between embedded devices such as PLC is encrypted by using a pair of NGUs to build a virtual dedicated communication link when the NGU as an individual security module is put externally in an embedded device communication network such as PLC.

NGU network card+PCIE communication. When the NGU and PLC or other devices form a system, PLC as a primary device and the NGU as a secondary device share two data regions inside the NGU to exchange resources in a communication interface mode of PCIE to realize communication data conversion between the PCIE and the network card.

The present invention comprises the following modules:

an access control active detection module used for filtering and intercepting a data flow without access permission, and immediately blocking data communication and giving an alarm when an unauthorized access flow is detected;

an identity authentication module used to conduct identity validity authentication using a site control device of NGU through own device certificates and other communication nodes and allow communication after passing the authentication;

a communication data encryption/decryption module used for establishing security encryption communication connection after passing identity authentication using the site control device of NGU, and securely encrypting data to be communicated using a domestic commercial cipher series algorithm to prevent communication contents from being intercepted;

a key certificate management module used to ensure normal realization of identity authentication function and communication encryption function, wherein main root certificates and signature private keys which participate in the operation process of data encryption and the digital certificate application of the device are securely stored and updated;

a key negotiation module used for detecting whether a key used by the communication encryption function has vulnerability (for example, the negotiated key digit is too short (the digit is less than a limiting value), or the key is transmitted in clear text or the access permission of the storage location of the key is too low (the permission is lower than a limiting value), etc.) and/or an overdue risk; and if so, conducting negotiation operation of a session key based on a technical method for security key negotiation; and a NGU dual-network card mode communication module and/or a NGU network card+PCIE communication module.

With respect to the traditional embedded electronic device without information security guard capability operated in the current industrial control system, the present invention proposes a security guard architecture based on a network guard unit (NGU). The network guard unit (NGU) is connected to the front end of each embedded electronic device in series. On the premise of satisfying the timeliness and reliability needs of different industrial applications, a security and trusted active guard technology is used to provide security functions such as identity authentication, communication data encryption/decryption and access control of communication behaviors of the traditional embedded electronic device.

In the embodiments of the present invention, PLC (programmable logic controller) is taken as a specific illustrating object. FIG. 1 is an architecture diagram of security guard of NGU in the present embodiment, but not limited to application to the PLC.

(1) Structural Composition of NGU System:

The structural composition of NGU system, as shown in FIG. 1, comprises an input Ethernet interface, an output Ethernet interface, a PCIE interface, a UART communication interface and a system debugging interface.

a) A digital system core module (FPGA) uses FPGA Zynq-7015 expandable processing platform of ZYNQ series from Xilinx company as NGU device system application to achieve a core unit. The system completes comprehensive integration including L1 and L2 caches, storage controller and frequently-used peripheral devices through hard wiring.

b) The NGU hardware interface supports parallel bus of 8/16/32 bit width and SPI serial bus. The software interface supports function libraries of the functions such as identity authentication, data encryption/decryption, digital signature and access control, supports Linux operating system and supports the protocols of TCP/IP, ICMP, SNMP, etc.

c) The NGU hardware part has an algorithm accelerator, a key memory, a key generator, a true random number generator, a Hash accelerator, etc., and supports many data encryption algorithms of DES, 3DES, AES, SM1, SM4 and SSF33. The rate based on encryption/decryption is not less than 3.91 MB/s.

d) The NGU device supports three signature algorithms of RSA, ECC and SM2. The RSA algorithm supports two key lengths of 1024 and 1280. The ECC algorithm supports two key lengths of 192 and 256. The SM2 algorithm supports the length of 256 bits.

Figure 2:
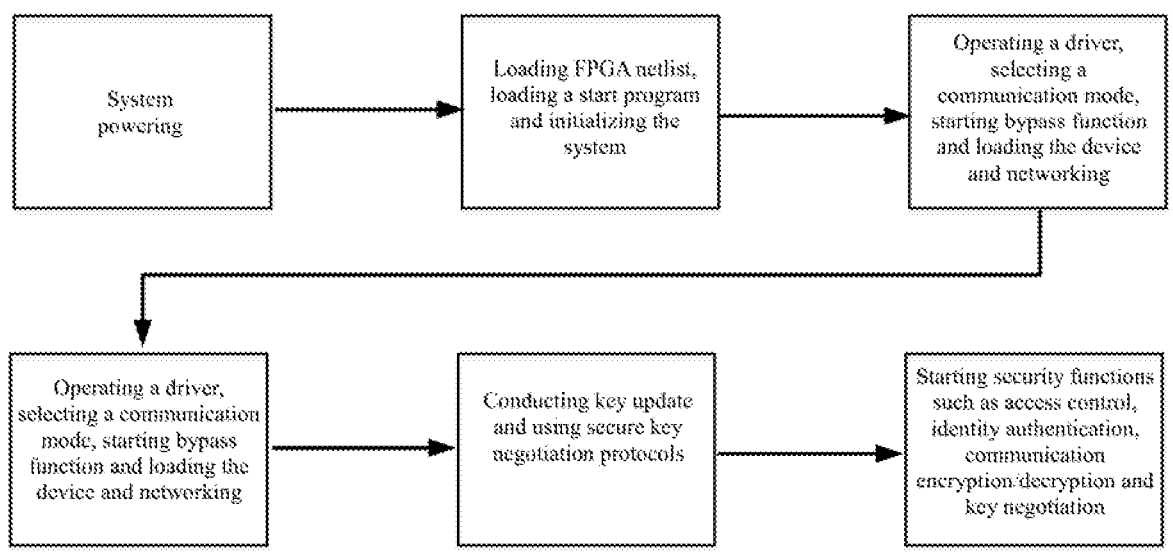
FIG. 2 is a flow chart of start of NGU in the present invention.

(2) Device Start:

After the NGU device is powered, the NGU device is started and the start process is shown below in FIG. 2.

a) The network guard unit (NGU) system is powered. In accordance with system configuration, the fpga netlist is loaded, boot program is loaded, the system is initialized, system software is loaded and a real-time operating system is operated.

b) A system driver is operated; a communication mode is selected; bypass function is started; and input Ethernet, output Ethernet and PCIE communication devices are loaded and communicated to realize device networking.

c) The NGU conducts key update; and symmetrical encryption and asymmetric encryption communication are conducted between the trusted PLC and the NGU and between the network guard units (NGU) through secure key negotiation protocols.

d) The NGU application software starts security functions such as access control, identity authentication, communication encryption/decryption and key negotiation.

(3) Dual Physical Communication Modes:

The NGU device supports the traditional Ethernet-Ethernet communication interface mode and also supports the Ethernet-PCIE (or other backplane bus) mode. After the device is successfully started, the communication mode is detected and selected. See FIG. 3a and FIG. 3b for the selection flow of the communication mode in the start process.

a) The network interface 1 is detected for the existence of data introduction. If there is communication, it indicates that the NGU device has been normally connected to the network.

b) The network interface 2 is detected for the connection to the network. If the network interface 2 is communicated, the Ethernet-Ethernet communication interface mode is selected. A bridge is established in the NGU. The network interface 1 and the network interface 2 are connected to the bridge.

c) If the network interface 2 cannot be connected to the network, the PCIE interface (or other backplane bus) is detected for successful connection. If the PCIE interface is successfully connected, a configuration program of PCIE is invoked and configuration data is transmitted through the PCIE interface.

d) If the network interface 2 and the PCIE interface cannot be connected, an alarm message is sent.

(4) Bypass Function:

The Bypass function guarantees the communication of the entire network when the NGU is not started or fails, avoids the accident of network disconnection and ensures the security and the reliability of the entire network. See FIG. 4a and FIG. 4b for the Bypass function in different states of the NGU.

a) In case of power interruption, the network interface 1 and the network interface 2 are physically directly communicated without NGU or other devices.

b) After the NGU is powered, internal detection is firstly conducted. If detection is passed, the network interface 1 and the network interface 2 are switched to connect to the NGU module and a connection mode is detected.

c) If internal detection is not passed after the NGU is powered, the network interfaces are still physically directly connected and an alarm message is sent.

(5) Encryption Chip Array

Figure 5:
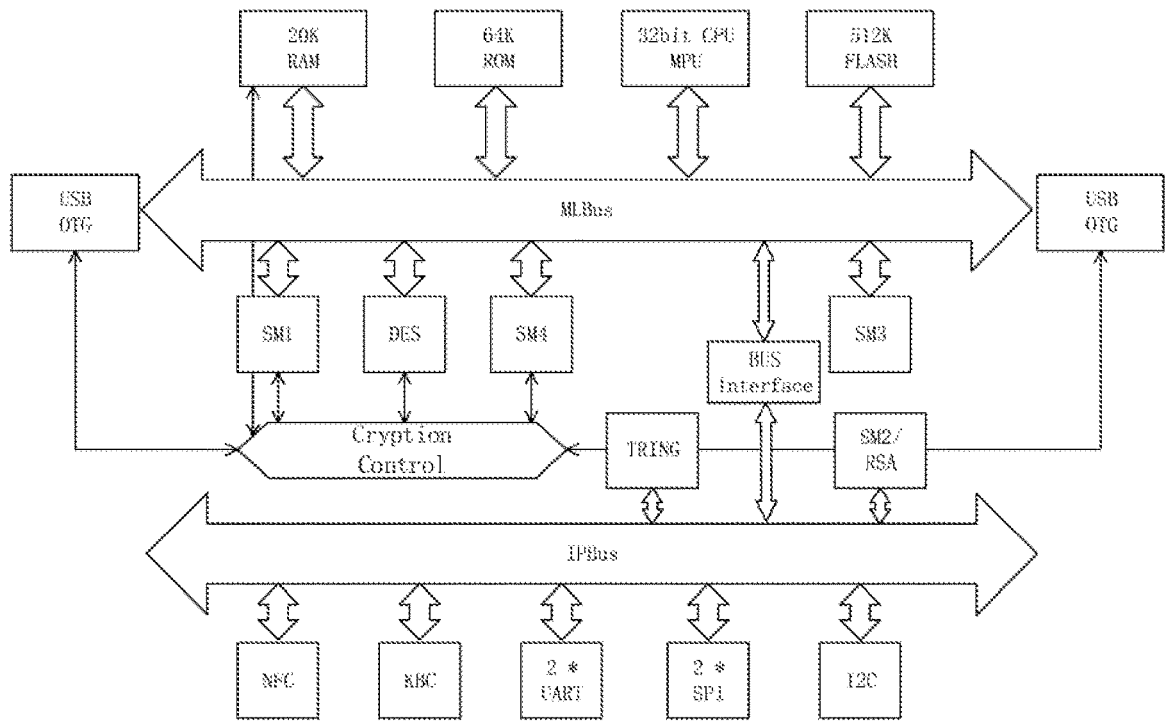
FIG. 5 is a schematic diagram of an encryption chip array of NGU device in the present invention.

A main board of NGU hardware is equipped with an encryption chip array that supports domestic cypher algorithms, and is responsible for providing algorithm support for identity authentication, key management, and data encryption/decryption communication functions of the NGU device. See FIG. 5 for the structural schematic diagram of hardware of the encryption chip array of the NGU device.

a) A chip encryption module supports dedicated domestic cypher algorithms of SM1, SM2, SM3 and SM4 and international algorithms of DES and RSA. Pure hardware produces true random numbers.

b) A chip storage module integrates 64 KB ROM and can mask mature firmware or protected codes to ROM. The cipher algorithms are protected by MPU. Internal SRAM of 20 KB can complete high speed data processing. Nor Flash of 512 KB is enough to satisfy different application needs.

c) A chip interface module has two USB OTG interfaces, a high speed of 480 Mbps and full speed of 12 Mbps; two SPI primary/secondary interfaces have speed of 400 KB/s; other interfaces include two UART and I2C interfaces.

d) The chip security design 1 has security technologies such as clock disturbance technology and bus disturbance technology to increase analysis difficulty of algorithm codes and enhance attack guard capability for simple power analysis (SPA) and differential power analysis (DPA).

e) The chip security design 2 uses closed debugging technology, line testing technology, secure wiring technology, etc. to prevent unauthorized personnel from directly adding a probe outside for detection and prevent detection attack of probe/FIB (focused ion beam).

f) The chip security design 3 uses an external flash memory to store key programs (such as firmware) and sensitive data. A sectioned chip cannot acquire encryption related data and program. The data in the external flash memory is encrypted, thereby fundamentally avoiding a possibility of acquiring the data by means of the sectioned chip.

g) The chip security design 4 uses a low-voltage detection circuit technology to protect the chip against critical low voltage attack.

(6) Principle of Dedicated Communication Technology of Dual Network Card NGU Devices When the dual network card NGU devices is used to encrypt the communication data, a pair of NGU devices shall be configured as a VPN server and a client. The NGU device at the server provides routing management for a virtual network card of the NGU device at the client.

a) When the NGU device at the client initiates a connecting request and data access for the NGU device at the server, the data packet flows through the virtual network card through route. A service process captures IP packets on the virtual network card, then uses SSL protocol to encapsulate the IP packets and sends out the IP packets through a physical network card.

b) The server and the client of the NGU devices support two connection modes of TCP and UDP. The connection mode (TCP or UDP) and port number of the NGU devices are predefined using a configuration tool. The client and the server of the NGU conduct SSL handshake based on this connection.

c) The NGU communication connection process comprises a handshake process of SSL and information management on the virtual network. The NGU device at the server sends network segment, address and routing information on virtual network connection to the client.

d) After successful connection, the NGU devices at the client and the server establish SSL security connection. The data interacted by the client and the server of the NGU is firstly packaged through the virtual network card and then sent out through the physical network card on TCP or UDP connection.

(7) Flow of Transmitting Data Packets by Dual Network Card NGU Devices

Figure 6:
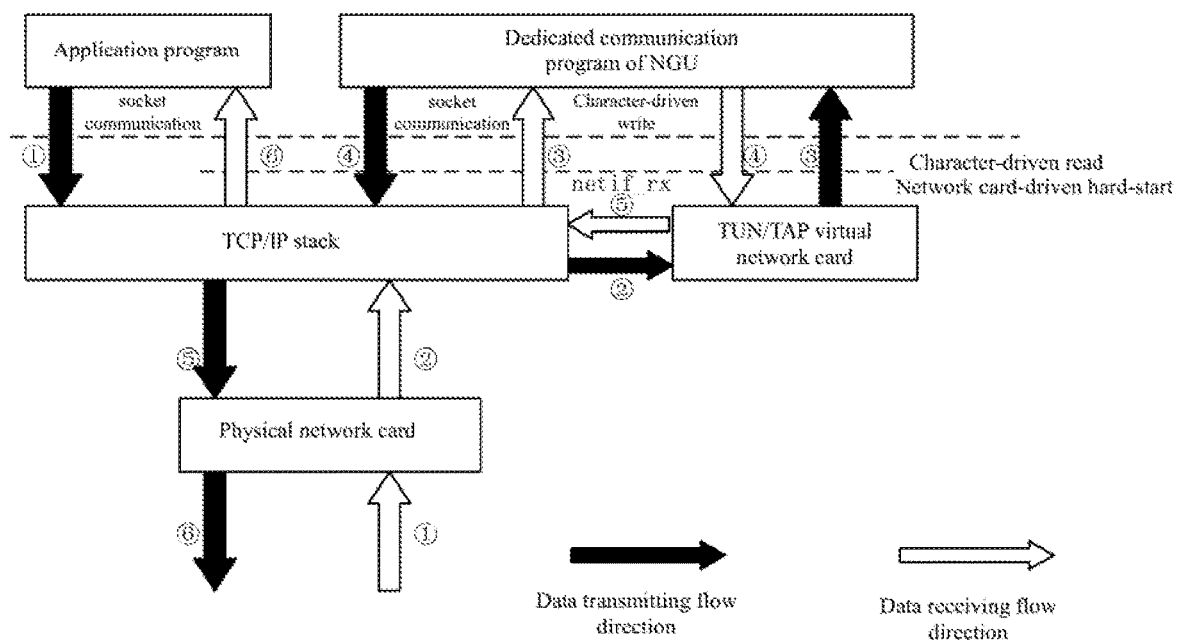
FIG. 6 is a flow chart of data reception and transmission of dual network card NGU devices in the present invention.

See the direction of a black arrow in FIG. 6 for the flow of transmitting data packets by the dual network card NGU devices.

a) The data sent by an application layer is firstly transmitted into a core TCP/IP layer through a system invoking interface for data processing.

b) When the data arrives at the virtual network card on the TCP/IP layer through routing, a network card driver of the virtual network card transmits a processing program hard_start_xmit( ) for adding the data packets to the skb linked list, and completes duplication of the data packets from a core region to a user region.

c) The dedicated communication program of the NGU devices invokes a character processing program tun_read( ) of the virtual network card, reads the data packets in the devices and encapsulates the read data packets using SSL protocol.

d) The encapsulated data packets are invoked through socket system and sent out.

(8) Flow of Receiving Data Packets by Dual Network Card NGU Devices

See the direction of a white arrow in FIG. 6 for the flow of receiving data packets by the dual network card NGU devices.

a) The physical network card receives the data packets, and the data packets are uploaded to the dedicated communication process of the NGU through the core TCP/IP.

b) The dedicated communication program of the NGU receives the data packets through link_socket_read( ), and unpacks the data packets using the SSL protocol. The processed data packets are written into a character device of the virtual network card by invoking the character processing program tun_write( ) of the virtual network card by the dedicated communication program of the NGU.

c) A virtual network card device driver completes duplication of the data from the user region to the core region, writes the data into the skb linked list and then invokes the receiving program netif_rx( ) of the network card. The data packets enter a TCP/IP stack of the system and are transmitted into an upper application program.

(9) Process of Establishing Communication by Dual Network Card NGU Devices

Figure 7:
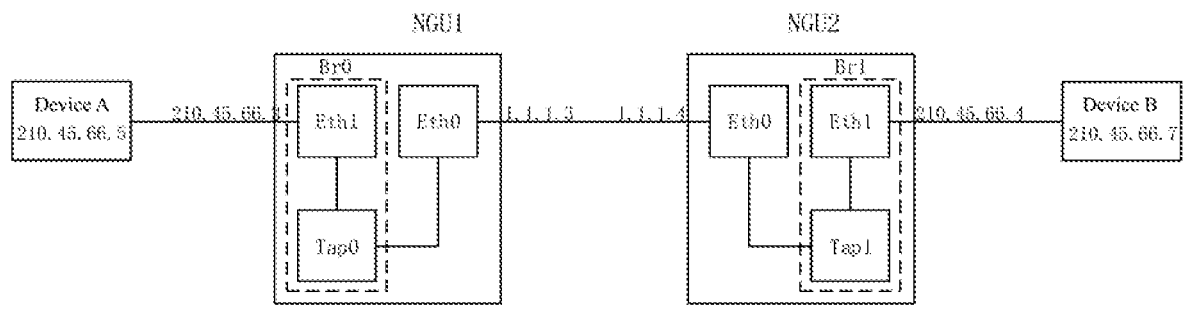
FIG. 7 is a topological structural diagram of a dedicated channel of dual network card NGU devices in the present invention.

The NGU dual-network card communication is in an Ethernet-Ethernet interface mode. When the NGU devices provide security guard for industrial communication devices such as PLC, a dedicated virtual communication network data link is established between two NGU devices, and the NGU devices on both sides are respectively connected with the PLC and an engineer station in a direct connection manner. When the PLC and the engineer station are communicated through the NGU devices, data is encrypted/decrypted; after processed by the NGU devices, the data is sent to an external network. The connection topology of the NGU and the communication device is shown in FIG. 7.

a) Firstly, a virtual network card device TAP0 is created for the NGU device 1, and a dedicated communication server process on the NGU device 1 is started. A server program is designated by designating command parameters and is responsible for processing data reception and transmission on the virtual network card TAP0. Similarly, a virtual network card TAP1 is created for the NGU device 2, and a dedicated communication client process on the NGU device 2 is started. A client program is designated to use the virtual network card TAP1.

b) Two network cards of the NGU devices respectively correspond to two different network segments. The network segment 1.1.1.* is an external network segment, and the network segment 210.45.66.* is an internal network segment for combining the external device and the NGU devices. For two different network segments, different IP addresses are allocated for two physical network cards of the NGU devices to make differentiation. For eth0 network card of the NGU device 1, the address such as 1.1.1.3 is allocated; and similarly, the IP address of 1.1.1.4 is allocated for the eth0 network card of the NGU device 2. eth0 of two NGU devices is used as an external network card for connection. The data packets processed by the dedicated data communication program of the NGU are sent and received finally through the network card eth0.

c) The internal network card eth1 of the NGU device 1 combines the virtual network card TAP0 and the internal physical network card eth1 used by the server program into a bridge device br0 at the dedicated communication server of the NGU in a bridging mode, so as to connect two different network segments of the NGU devices of the client and the server so that the NGU devices can communicate with each other. An IP address such as 210.45.66.3 is set for the bridge device br0.

d) The internal network card eth1 and the virtual network card TAP1 of the NGU device 2 are bridged to establish a bridge device br1 in accordance with the steps in c). An IP address such as 210.45.66.4 is set for the bridge br1.

e) After the above arrangement, a network interface corresponding to the physical network card eth1 of the NGU device 1 is connected to an embedded device A, and an Intranet address such as 210.45.66.5 is allocated for the device A; a network interface corresponding to the physical network card eth1 of the NGU device 2 is connected to an embedded device B, and an Intranet IP address such as 210.45.66.7 is allocated for the device B.

f) After IP addresses of internal and external network segments of the NGU devices and the embedded devices are configured in the bridging mode, a dedicated virtual communication link between the embedded device A and the device B is established. When the data passes through the NGU device, after the data is encrypted and packed/unpacked and decrypted on the internal virtual network card of the NGU, the data is sent to the external network card of the NGU for data reception and transmission. The data packets on the external network are invisible, thereby ensuring the privacy.

Figure 8:
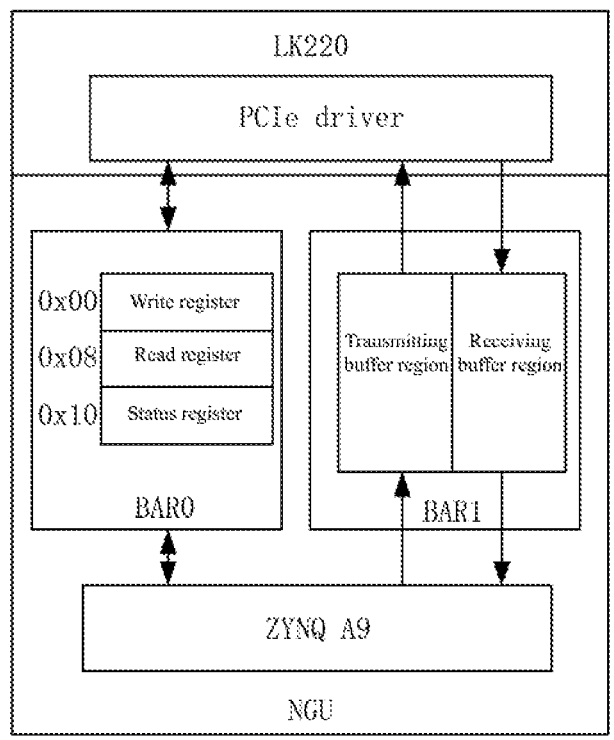
FIG. 8 is a system block diagram of NGU PCIE in the present invention.

(10) NGU PCIE Communication Structure:

The NGU device supports the traditional Ethernet-Ethernet communication interface mode and also supports the Ethernet-PCIE (or other backplane bus) mode. When the NGU uses the PCIE communication interface mode, the NGU and the PLC jointly form a system. The internal NGU PCIE communication structure is shown in FIG. 8.

a) In the entire PLC system, a traditional PLC is used as a primary device (Root Complex) and the NGU is used as a secondary device (End Point). When two devices conduct data communication, the two devices share two data register regions Bar0 and Bar1 established in PL part in the NGU. Bar0 is a control region, and Bar1 is a data exchange region.

b) The PLC and the NGU share the data region Bar1, and access a status word "status" in Bar0 in the polling mode to know whether the data are exchanged.

c) Bar0 is 32-bit FIFO as interaction of Descripter between the NGU and the main controller PLC. See Table 1 for the composition of Bar0 (content table of spatial composition of part of BAR0 of NGU PCIE in the present invention).

TABLE 1

| Bar0 Spatial Composition | | |
| --- | --- | --- |
| Address Offset | Name | Description |
| 0x00 | WDATA[31: 0] | For LK220, if LK220 has data to be transmitted to the NGU, data of one frame is firstly written into bar1; and then the descripter of the frame is written into bar1. If there are multiple frames, the data is also firstly written into bar1, and then the descripter of each frame is written into the address. NGU may know that the LK220 has data for exchange. |

TABLE 1-continued

Bar0 Spatial Composition

Figure 9:
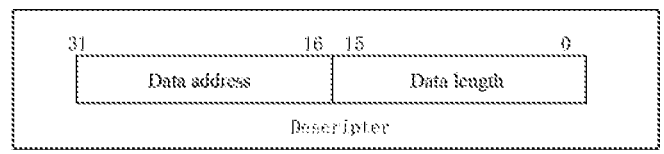
FIG. 9 is a structural composition diagram of communication data Descripter of NGU PCIE in the present invention.
Figure 11:
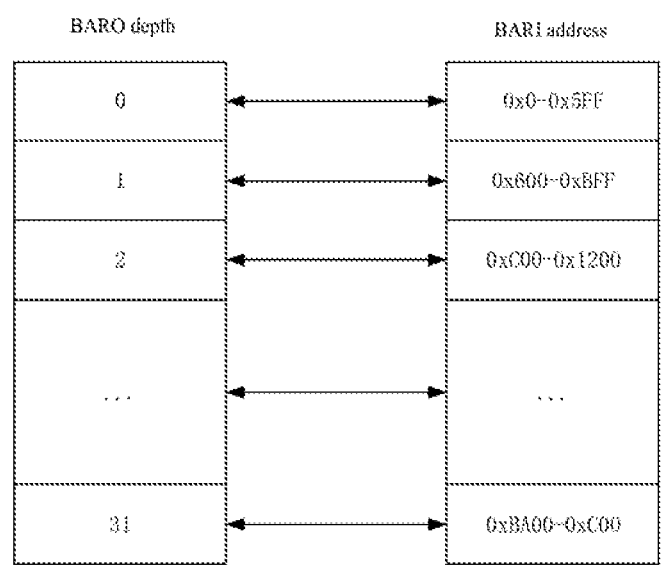
FIG. 11 is a schematic diagram of an address mapping relationship of BAR0 and BAR1 of part of NGU PCIE in the present invention.

| Address Offset | Name | Description |
| --- | --- | --- |
| 0x08 | RDATA[31: 0] | When LK220 polling status knows that the NGU has data for exchange with LK220, the descripter is read out from this address. The data of one frame with corresponding length is read according to the descripter at the corresponding address of bar1. |
| 0x10 | STATUS[31: 0] | (Status & 0x01) == 0, which indicates that there is data for exchange in the other party, and the descripter in RDATA shall be read. | d) Descripter definition and structure. Descripter is formed by 32 bit, wherein high 16 bit is the address of the data in Bar1, and low 16 bit is the length of the data frame. See FIG. 9 for Descripter structure.

e) Bar1 is used as a polling mode data buffer region. In a polling mode, when there is data interaction, firstly the data is written into bar1 buffer region; then the length and the address of the data written into the bar1 buffer region are combined into the Descripter and the Descripter is written into bar0; bar0 data is read at the other end; and the data in bar1 is read out according to the actual address of the read data acquired by the Descripter.

f) Bar1 spatial definition. Bar1 is formed by 128 KB, wherein low 64 KB is the data written to the NGU by the main controller PLC, and high 64 KB is the data to be supplied to the main controller PLC by the NGU.

g) The maximum size of the data packets is not more than 1500 bytes. The data is written into Bar1 in the alignment format of 0x600 address. The data is written circularly. The maximum writing address is 0xxxxx, 32 pieces of data can be written circularly, which are corresponding to fifo with depth of 32 in Bar0, thereby ensuring that data is not overlapped. See FIG. 11.

Figure 10:
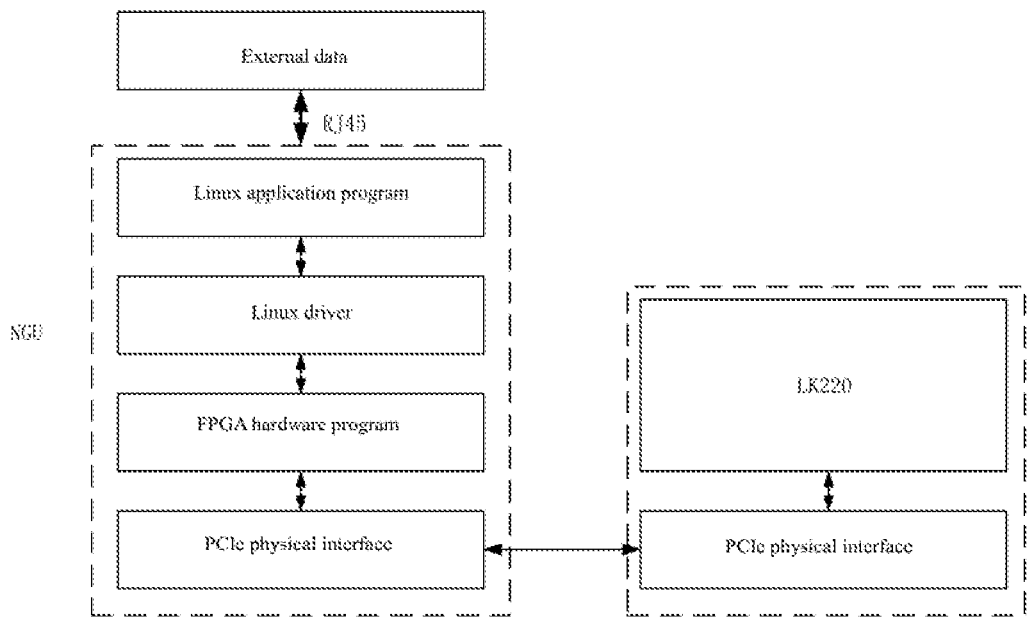
FIG. 10 is a flow chart of communication of NGU PCIE in the present invention.

(11) Process of Receiving Network Data by NGU PCIE Communication:

See FIG. 10 for the process of receiving network data by NGU PCIE communication.

a) The NGU captures network data packets received by the network interfaces through a packet capturer.

b) After processing, the NGU writes the data into RX Buffer of Bar1, combines a writing address and a writing length into 32-bit Descripter and then writes the Descripter of the data of the frame into Bar0. In the writing process, Bar0 status is firstly detected. If the Bar0 is full, an error is returned.

c) At this moment, the main controller PLC always polls the status of Bar0. When (Status & 0x01)==0, it indicates that the NGU has data to be supplied to the main controller PLC. The main controller PLC reads out a Descripter from the RDATA of Bar0 to know the start address of the data of the frame in Bar1 RX buffer and the data length, and then reads off the data.

d) The main controller PLC can also continuously read off multiple Descripters when polling the status, and then can read off multiple data at a time.

(12) Process of Transmitting Network Data by NGU PCIE Communication:

See FIG. 10 for the process of transmitting network data by NGU PCIE communication.

a) The main controller PLC writes the data to be transmitted into TX Buffer of Bar1, combines a writing address and a writing length into Descripter and then writes the corresponding Descripter into Wdata of Bar0.

b) By polling the status in Bar0, the NGU may know that the main controller PLC has data to be transmitted and the data has been prepared. After the NGU reads off cached data from TX buffer according to the Descripter and processes the data, the processed data is submitted to the packet capturer.

c) The packet capturer sends out the received data packets by the NGU network interface.

We claim:

1. A network guard unit (NGU) for an industrial embedded system, comprising:
an access control active detection module used for filtering and intercepting a data flow without access permission, and immediately blocking data communication and giving an alarm when an unauthorized access flow is detected;
an identity authentication module used to conduct identity validity authentication using a site control device of NGU through own device certificates and other communication nodes and allow communication after passing the authentication;
a key negotiation module used for detecting whether a key used by a communication encryption function has vulnerability and/or is overdue; if so, conducting negotiation operation of a session key;
a communication data encryption/decryption module used for establishing encryption/decryption communication connection after passing identity authentication using the site control device of NGU; and encrypting and decrypting data to be communicated using a domestic commercial cipher series algorithm;
a NGU dual-network card mode communication module and/or a NGU network card+Peripheral Component Interconnect Express (PCIE) communication module,
wherein the NGU dual-network card mode communication module is used for encrypting communication data between embedded devices by using a pair of NGUs to build a virtual communication link when the NGU as an individual module is put externally in an embedded device communication network;
the NGU network card+PCIE communication module is used for a programmable logic controller (PLC) as a primary device and the NGU as a secondary device to share two data regions inside the NGU to exchange resources in a communication interface mode of PCIE when the NGU and the embedded device form a system, to realize communication data conversion between the PCIE and the network card,
wherein, during operation, the access control active detection module executes the following steps:
a) firstly, capturing data flows through a promiscuous mode of a network card;
b) conducting protocol analysis on the captured data;
c) parsing an application layer protocol of a protocol; and
d) matching protocol parsing contents in the data flows with the set matching rule contents for consistence; if consistent, releasing the data flows; otherwise, intercepting the data flows and warning.

2. The network guard unit for the industrial embedded system according to claim 1, wherein the implementation of the NGU dual-network card mode communication module comprises the following steps:
a) firstly, respectively setting a pair of NGUs as a serving and a client, associating a physical network card 2 of the server NGU with an embedded device A, and creating a virtual network card device Terminal Access Point 0 (TAP0);

b) associating a physical network card 2 of the client NGU with an embedded device B, creating a virtual network card device Terminal Access Point 1 (TAP1), and communicating with the server NGU;

c) bridging the physical network card 2 of the server NGU and the virtual network card device TAP0 as a bridge device br0, and bridging the physical network card 2 of the client NGU and the virtual network card device TAP1 as a bridge device br1; and d) connecting the server NGU and the client NGU into an actual network, i.e., establishing a virtual communication connection between the NGUs, responsible for encrypting the communication data between the embedded devices.

3. The network guard unit for the industrial embedded system according to claim 1, wherein the implementation of the NGU device network card+PCIE communication module comprises the following steps:

a) establishing two cache regions by the NGU, i.e., bar0 and bar1; using bar0, being FIFO of 32 bits, as interaction of descripter between the NGU and a PLC main controller; using bar1 as a polling mode data buffer region; in a polling mode, when there is data interaction, firstly writing the data into bar1 buffer region; then combining the writing length and the writing address of the bar1 buffer region into the descripter and writing the descripter into bar0; reading bar0 data at the other end; and reading out data in bar1;

b) in a data communication process, regarding the NGU as an external connection network card of the PLC main controller; the data entering through a network interface of the NGU; the NGU capturing a data packet through a libpcap packet capture program; subsequently, the NGU writing the data packet into the bar1 buffer region and combining a writing address and a writing length into the descripter of 32 bits; writing the descripter into bar0; in a writing process, detecting a bar0 state at first; if bar0 is full, returning an error; and c) after receiving bar0 data, the PLC main controller reading out data in bar1 according to the descripter and processing the network data packet.

4. The network guard unit for the industrial embedded system according to claim 3, wherein the network guard unit also comprises transmission of the network data packet by the NGU, comprising the following steps:

firstly, writing the data packet into the bar1 buffer region, combining into a descripter according to the writing address and the length, and writing into bar0 if bar0 is not full; polling bar0 every several ms at the NGU; when bar0 is not empty, the NGU reading out the descripter in bar0 and reading out the data packet cached in bar1 according to the descripter; and sending out the data packet through libpcap via the network interface.

5. A guard method for the network guard unit for the industrial embedded system, comprising the following steps:

an access control active detection module filtering and intercepting a data flow without access permission, and immediately blocking data communication and giving an alarm when an unauthorized access flow is detected;

an identity authentication module conducting identity validity authentication using a site control device of NGU through own device certificates and other communication nodes, and allowing communication after passing the authentication;

a key negotiation module detecting whether a key used by a communication encryption function has vulnerability and/or is overdue; if so, conducting negotiation operation of a session key;

a communication data encryption/decryption module establishing encryption/decryption communication connection after passing identity authentication using the site control device of NGU; and encrypting and decrypting data to be communicated using a domestic commercial cipher series algorithm;

a NGU dual-network card mode communication module and/or a NGU network card+PCIE communication module, wherein the NGU dual-network card mode communication module is used for encrypting communication data between embedded devices by using a pair of NGUs to build a virtual communication link when the NGU as an individual module is put externally in an embedded device communication network;

the NGU network card+PCIE communication module is used for the PLC as a primary device and the NGU as a secondary device to share two data regions inside the NGU to exchange resources in a communication interface mode of PCIE when the NGU and the embedded device form a system, to realize communication data conversion between the PCIE and the network card, wherein a step that the NGU dual-network card mode communication module encrypts communication data between embedded devices by using a pair of NGUs to build a virtual communication link comprises the following steps:

a) firstly, respectively setting a pair of NGUs as a serving and a client, associating a physical network card 2 of the server NGU with an embedded device A, and creating a virtual network card device TAP0;

b) associating a physical network card 2 of the client NGU with an embedded device B, creating a virtual network card device TAP1, and communicating with the server NGU;

c) bridging the physical network card 2 of the server NGU and the virtual network card device TAP0 as a bridge device br0, and bridging the physical network card 2 of the client NGU and the virtual network card device TAP1 as a bridge device br1; and d) connecting the server NGU and the client NGU into an actual network, i.e., establishing a virtual communication connection between the NGUs, responsible for encrypting the communication data between the embedded devices.

6. The guard method for the network guard unit for the industrial embedded system according to claim 5, wherein a step that the NGU network card+PCIE communication module enables two devices to share two data regions inside the NGU to exchange resources to realize communication data conversion between the PCIE and the network card comprises the following steps:

a) establishing two cache regions by the NGU, i.e., bar0 and bar1; using bar0, being FIFO of 32 bits, as interaction of descripter between the NGU and a PLC main controller; using bar1 as a polling mode data buffer region; in a polling mode, when there is data interaction, firstly writing the data into barn buffer region; then combining the length and the address written into the barn buffer region into the descripter and writing the descripter into bar0; reading bar0 data at the other end; and reading out data in barn;
b) in a data communication process, regarding the NGU as an external connection network card of the PLC main controller; the data entering through a network interface of the NGU; the NGU capturing a data packet through a libpcap packet capture program; subsequently, the NGU writing the data packet into the bar1 buffer region and combining a writing address and a writing length into the descripter of 32 bits; writing the descripter into bar0; in a writing process, detecting a bar0 state at first; if bar0 is full, returning an error; and
c) after receiving bar0 data, the PLC main controller reading out data in bar1 according to the descripter and processing the network data packet.

7. The guard method for the network guard unit for the industrial embedded system according to claim 5, further comprising transmission of the network data packet by the NGU, comprising the following steps:

firstly, writing the data packet into the bar1 buffer region, combining into a descripter according to the writing address and the length, and writing into bar0 if bar0 is not full; polling bar0 every several ms at the NGU; when bar0 is not empty, the NGU reading out the descripter in bar0 and reading out the data packet cached in bar1 according to the descripter; and sending out the data packet through libpcap via the network interface.

* * * * *